United States Patent
Blanc

(10) Patent No.: US 7,029,990 B2
(45) Date of Patent: Apr. 18, 2006

(54) METHOD OF ASSEMBLING ELEMENTS BY LOCALIZED HEATING

(75) Inventor: Henri Blanc, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/468,731

(22) PCT Filed: Feb. 28, 2002

(86) PCT No.: PCT/FR02/00727

§ 371 (c)(1),
(2), (4) Date: Feb. 3, 2004

(87) PCT Pub. No.: WO02/070188

PCT Pub. Date: Sep. 12, 2002

(65) Prior Publication Data
US 2004/0110359 A1    Jun. 10, 2004

(30) Foreign Application Priority Data
Mar. 2, 2001    (FR) ................... 01 02884

(51) Int. Cl.
*H01L 21/30* (2006.01)
(52) U.S. Cl. .................................................. 438/455
(58) Field of Classification Search ............... 438/455, 438/456, 458
See application file for complete search history.

(56) References Cited

U.S. PATENT DOCUMENTS

| 4,634,832 A | 1/1987 | Martyr |
| 4,866,242 A | 9/1989 | Martyr |
| 5,009,689 A | 4/1991 | Haisma et al. |
| 6,049,054 A | 4/2000 | Panchison et al. |
| 6,163,011 A | 12/2000 | Urushizaki et al. |

FOREIGN PATENT DOCUMENTS

| DE | 38 20 848 | | 4/1989 |
| DE | 4219132 A1 | * | 12/1993 |
| GB | 2 074 070 | | 10/1981 |
| JP | 61169183 | | 7/1986 |
| JP | 2000313630 | | 11/2000 |
| WO | WO 02/070188 | | 9/2002 |

OTHER PUBLICATIONS

International Search Report dated Jul. 12, 2002.

* cited by examiner

*Primary Examiner*—Scott Geyer
(74) *Attorney, Agent, or Firm*—Thelen Reid & Priest LLP

(57) ABSTRACT

The invention relates to a process of assembly of at least two silicon substrates. The method comprises:
  a step of placing in contact a first silicon substrate (9) with a second silicon substrate (10), the first and second substrates (9, 10) being substantially non-transparent for a wavelength λ of laser radiation (R), and
  a step of illuminating the first silicon substrate (9) with a laser beam of wavelength λ to create a fusion path (21), along the laser beam axis (A1-A2), in the thickness of the first substrate (9) and in all or part of the thickness of the second substrate (10).

The invention is applied to the sealing of cavities and of mechanical or electrical joints situated at the interface of two silicon substrates.

7 Claims, 3 Drawing Sheets

METHOD OF ASSEMBLING ELEMENTS BY LOCALIZED HEATING

CROSS-REFERENCE TO RELATED APPLICATION

This application claims priority based on International Patent Application No. PCT/FR02/00727, entitled "Method For Assembling Elements By Localized Heating" by Henri BLANC which claims priority of French application no. 01/02884, filed on Mar. 2, 2001, and which was not published in English.

TECHNICAL FIELD AND PRIOR ART

The present invention relates to a method of assembly of elements by localized heating.

More particularly, the invention relates to a method of assembly by localized heating of at least two substantially planar silicon substrates of low thickness. The two silicon substrates can be, for example, plates, laminae, slices, thin films or thin layers.

The invention is applied, for example, to the sealing of cavities and of mechanical or electrical joints situated at the interface of two substrates.

According to the known art, the substantially planar assembly of elements is formed with or without addition of material.

Assembly without addition of material may be performed by placing two polished surfaces in contact after chemical preparation of the surfaces, then heating for consolidation. The materials placed in contact may be Si/Si, Si/SiO$_2$, Si/metal, or metal/metal. This type of assembly is known to those skilled in the art by the term "wafer bonding". Another type of assembly without addition of material is known under the term anodic-type assembly. It then relates to establishing the bond between two materials reacting at the interface under the conjoint effect of an electric field and of temperature (for example, a Si/Pyrex glass or Al/Pyrex glass interface).

Assembly with the addition of material may be an adhesive type assembly. An adhesive intermediary, for example epoxy resin, may be localized between the elements to be assembled. A metallic type assembly may likewise be concerned:

addition of a metal, the alloy of which with the materials to be assembled has a melting point lower than that of the metal (e.g., Si/metal/Si), hybridization of elementary chips on the substrate, fusion of metals.

The assembly methods of the prior art have numerous disadvantages.

The chemical preparation of the surfaces is thus prohibited for the assembly of already completed and thus fragile circuits. The same is true for methods necessitating a rise in temperature of the circuits. The addition of intermediate material is likewise a disadvantage.

SUMMARY OF THE INVENTION

The invention does not have these disadvantages.

In fact, the invention relates to a method of assembly of at least two silicon substrates. The method comprises:

a step of placing in contact at least one substantially planar face of a first silicon substrate with a substantially planar face of a second silicon substrate so as to constitute an interface between the first and second substrates, the first and second substrates being substantially non-transparent for a laser radiation wavelength $\lambda$, and a step of illuminating the first silicon substrate with a laser beam of wavelength $\lambda$ to create a fusion path, along the laser beam axis, in the thickness of the first substrate and in all or part of the thickness of the second substrate.

According to a supplementary characteristic of the invention, the creation of the fusion path is accompanied by a reduction of mechanical strength of the silicon at the interface between the fusion path and the remainder of the silicon substrate and, on both sides of the fusion path, over a finite distance, direct sealing of the interface between the two silicon substrates.

According to yet another supplementary characteristic of the invention, the laser beam of wavelength $\lambda$ is displaced on the surface of the first substrate so as to create successive fusion paths defining a plane. In this latter case, according to yet another supplementary characteristic of the invention, the method comprises a step of cutting by cleavage along at least one plane created by the successive fusion paths.

According to yet another supplementary characteristic of the invention, the laser beam of wavelength $\lambda$ is displaced on the surface of the first substrate so as to create successive fusion paths defining a non-planar surface. In this latter case, according to yet another supplementary characteristic of the invention, the method comprises a step of cutting by KOH etching along at least one non-planar surface created by successive fusion paths.

According to another supplementary characteristic of the invention, the method comprises a step of forming a vacuum between the two faces of the silicon substrates which are placed in contact.

According to yet another supplementary characteristic of the invention, the laser radiation is infrared radiation of wavelength $\lambda$ substantially equal to 1064 nm, of mean power substantially equal to 12 W, and constituted by pulses of frequency substantially equal to 3 kHz.

The contacting surfaces to be sealed have very low roughness and good planarity. Outside the surfaces to be sealed, the facing surfaces may be structured and consequently spaced apart. This is the case, for example, in circuits manufactured by micro-technology according to integrated circuit technology.

The method of assembly acts by direct sealing of the substrates because of the quality of contact present at the interface of the substrates.

Advantageously, the zones placed in contact according to the method of the invention may define a cleavage path for later cutting.

It is likewise possible to prolong the method according to the invention itself as far as the cutting of circuits. In the same operation, it is then possible, for example, to assemble certain elements and to cut off others from them.

In the two cases, the cutting-off can advantageously be performed without the usual protections used in the standard cutting methods (water jet, particle jet, circuit reversal, etc.).

BRIEF DESCRIPTION OF THE FIGURES

Other characteristics and advantages of the invention will become apparent on reading an embodiment of the invention with reference to the accompanying figures, among which.

In all the figures, the same reference numerals denote the same elements.

DETAILED DESCRIPTION OF EMBODIMENTS OF THE INVENTION

Figure 1:
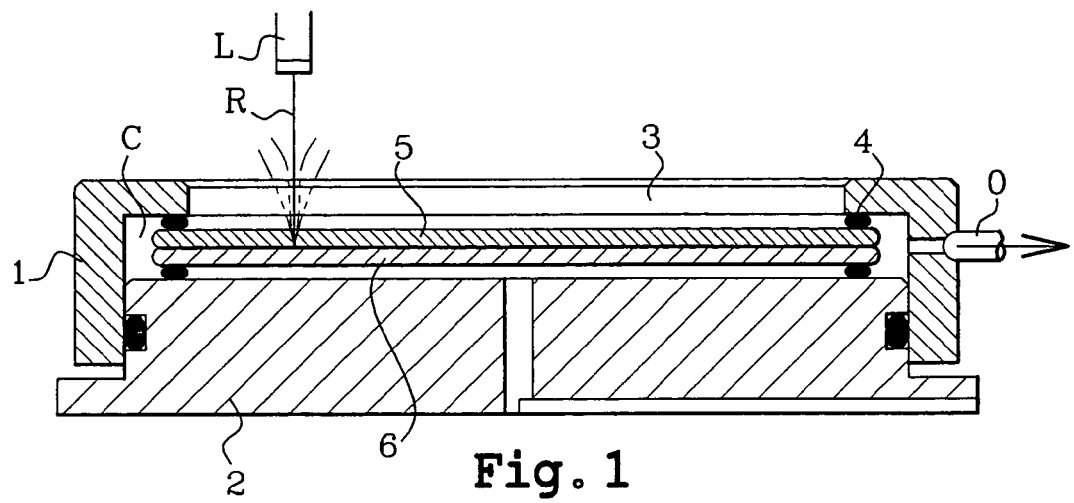
FIG. 1 shows an arrangement for assembling two planar elements of low thickness according to the invention.

FIG. 1 shows an arrangement for assembling two planar elements of low thickness according to the invention.

Two planar elements of low thickness 5 and 6, for example, two silicon plates or a substrate supporting a thin layer facing another plate or another thin layer supported by another substrate, are placed within a cavity C and placed in mutual contact. The cavity C is defined by the space formed between a support 2 and a cover 1. An orifice O connected to a vacuum pump (not shown) permits evacuation of the cavity C and consequently a vacuum to be formed between the two faces to be united. Joints 4 permit isolating the volume comprised between the two surfaces to evacuate it so that the two surfaces come into perfect contact.

In the case of non-deformable substrates, the surfaces will have to have quasi-perfect planarity.

In the case of at least one thin, and thus deformable, substrate, planarity over a short distance will be sufficient. A lack of planarity over a long distance may be compensated by a deformation of the thin substrate. The cover 1 has as large as possible an opening 3 for a radiation R of wavelength λ from a laser L. The radiation R can then reach the element 5. The laser L is, for example, a pulsed YAG power laser emitting in the infrared. By way of example, without limitation, for two silicon plates 450 µm thick, the wavelength λ of the radiation is equal to 1064 nm, the mean power is equal to 12 W, and the pulse frequency is 3 kHz. The laser radiation may be controlled, for example, to obtain a beam of diameter between 30 and 50 µm. The mean power at the surface of the element 5 can then be equal to 8 or 9 W.

The power absorbed by the silicon at the infrared frequency is low. The result is melting of the silicon with very little ejected material where the laser beam passes over the elements 5 and 6. There is then amorphization of the silicon over the whole thickness passed over.

Figure 2:
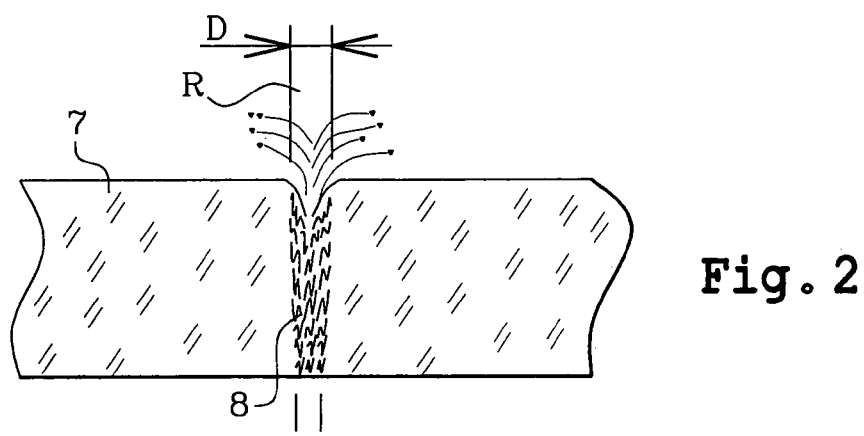
FIG. 2 shows the action of laser radiation of wavelength λ on a planer element of low thickness, not transparent to a wavelength λ.

FIG. 2 shows the action of a radiation R of diameter D on a thin layer of silicon 7. Material is ejected over a very low depth, while a band of amorphous silicon 8 is formed on the beam path. To form the band of amorphous silicon, the displacement speed of the laser beam over the surface of the layer of silicon may be comprised, for example, between 0.5 mm/s and 2 mm/s.

Figure 3:
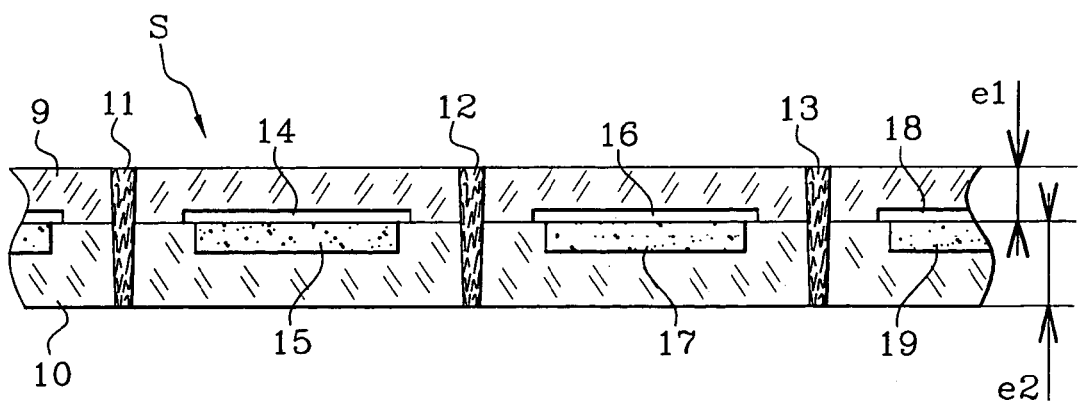
FIG. 3 shows an example of a structure assembled according to the invention.

FIG. 3 shows an example of a structure assembled according to the invention.

The structure S comprises two silicon substrates 9 and 10 fixed together by three bands 11, 12, 13 of amorphous silicon. The thickness e1 of the substrate 9 is for example equal to 300 µm and the thickness e2 of the substrate 10 for example equal to 500 µm. Advantageously, only a portion of the amorphous silicon bands fixes the substrates together. As will become apparent from the description hereinafter, fixing the substrate is principally performed by zones situated on both sides of the fusion path.

The structure S constitutes, for example, a seismic sensor. The substrate 10 then comprises an assembly of active zones or sensors 15, 17, 19. Cavities 14, 16, 18 are formed above the respective sensors 15, 17, 19. The substrate 9 is a cover intended to protect the sensors from shocks and dust and permits electrical contacts to be made through apertures (not shown in the figure).

Figure 4:
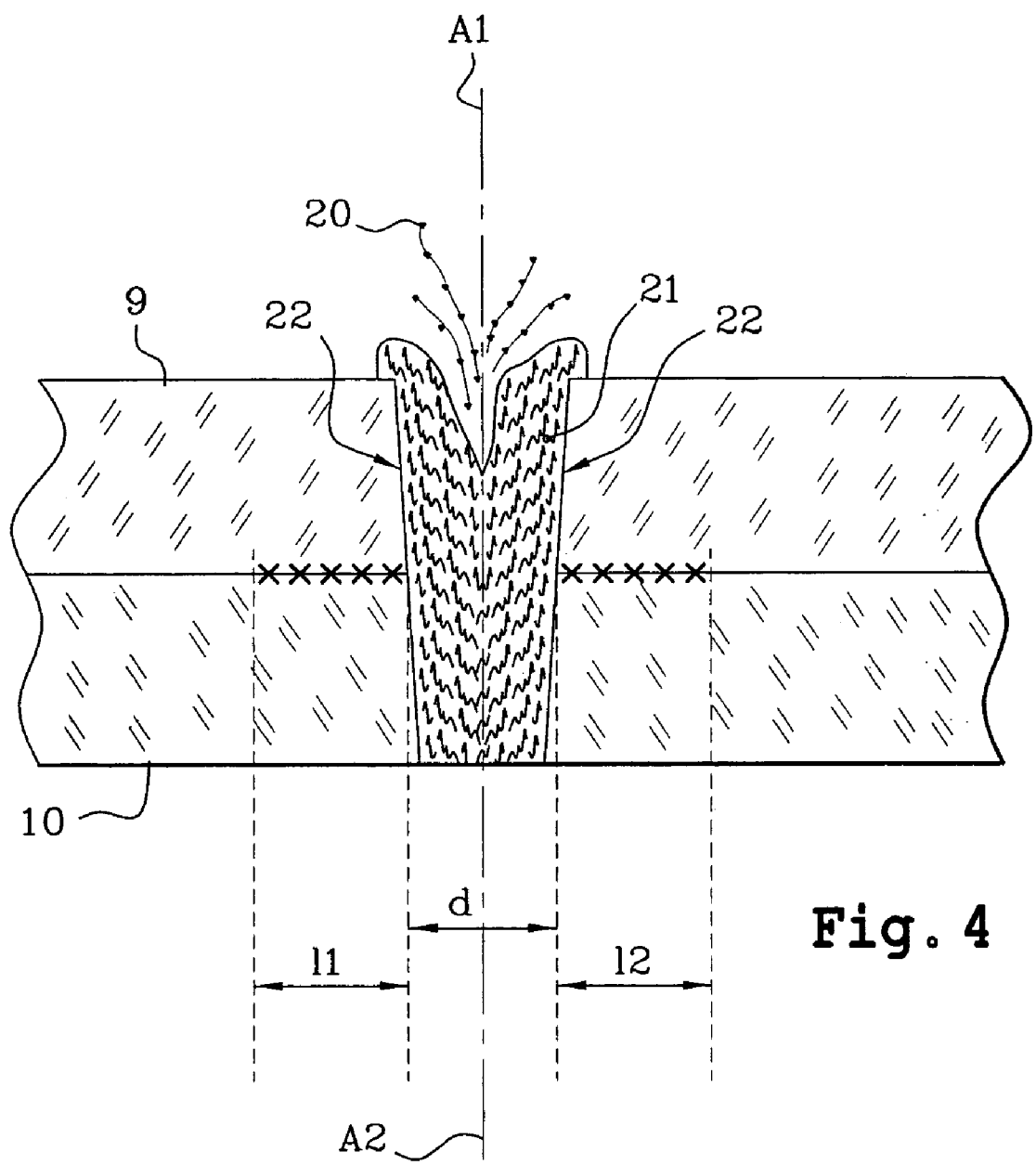
FIG. 4 shows the action of a laser beam for the assembly of a structure according to FIG. 3.
Figure 5:
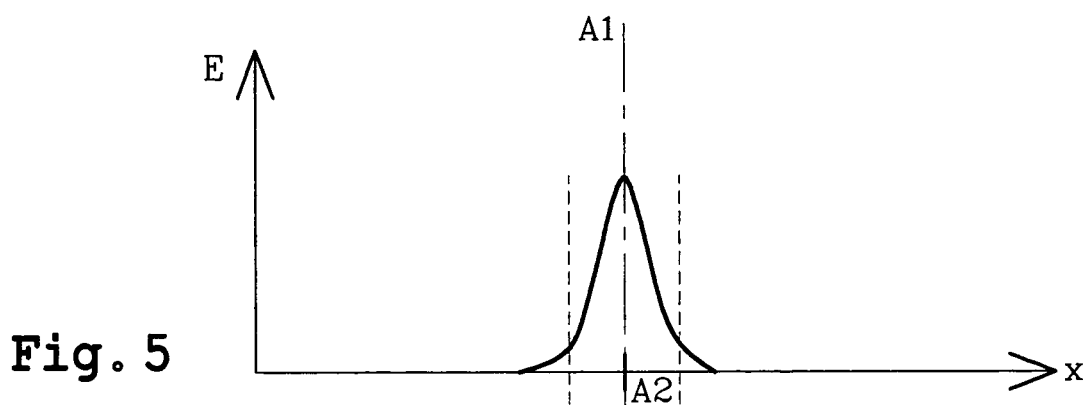
FIG. 5 shows the energy distribution of a laser beam used for assembling a structure such as shown in FIG. 3.
Figure 6:
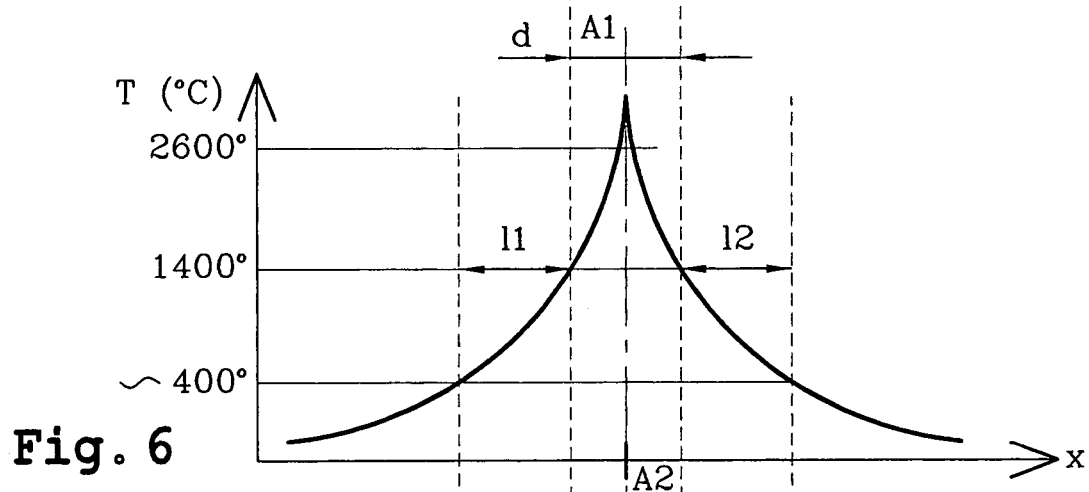
FIG. 6 shows the temperature distribution in a band of silicon subjected to a laser beam whose energy is distributed as shown in FIG. 5.

FIG. 4 shows the action of a laser beam for the assembly of a structure according to FIG. 3, and FIGS. 5 and 6 respectively show the curve of laser beam energy distribution and the curve of temperature distribution in a silicon band during the assembly of the structure according to FIG. 3.

As has previously been mentioned, the power absorbed by silicon at infrared frequencies is low. As a result, very little material 20 is ejected when the laser beam passes successively over the silicon substrates 9 and 10.

A zone of molten silicon 21 appears over a width d in the silicon. The width d, for example equal to 40 µm, substantially corresponds to the width of the laser beam for which the beam energy E is maximal (cf. FIG. 5). In the silicon melted by the action of the laser beam, the temperature varies from substantially 2,600° C. at the level of the axis A1-A2 of the laser beam to substantially 1,400° C. at a distance d/2 from the axis A1-A2 (cf. FIG. 6). Boiling of the silicon at the center of the molten zone 21 advantageously leads to a certain porosity of this zone. An interface 22 appears between the molten zone 21 and the non-molten, monocrystalline silicon of the substrates 9 and 10 situated beyond the molten zone (clear transition between liquid phase and solid phase).

The temperatures in the silicon decrease rapidly on either side of the zone 21 of width d, going away from the axis A1-A2 of the beam, for example from substantially 1,400° C. to substantially 400° C. These temperatures are however sufficient to permit a junction between the substrates 9 and 10 by direct sealing between the two substrates. This junction by direct sealing takes place, on either side of the zone 21, over the respective finite distances 11 and 12.

After the formation of the bands 11, 12, 13 of amorphous silicon as shown above, the assembled structure of FIG. 3 advantageously remains integral, that is, manipulable without risk of fracturing. It is then possible to pursue different types of technological steps which do not lead to high mechanical stresses. It is likewise possible to cut the structure along the interfaces 22.

Figure 7:
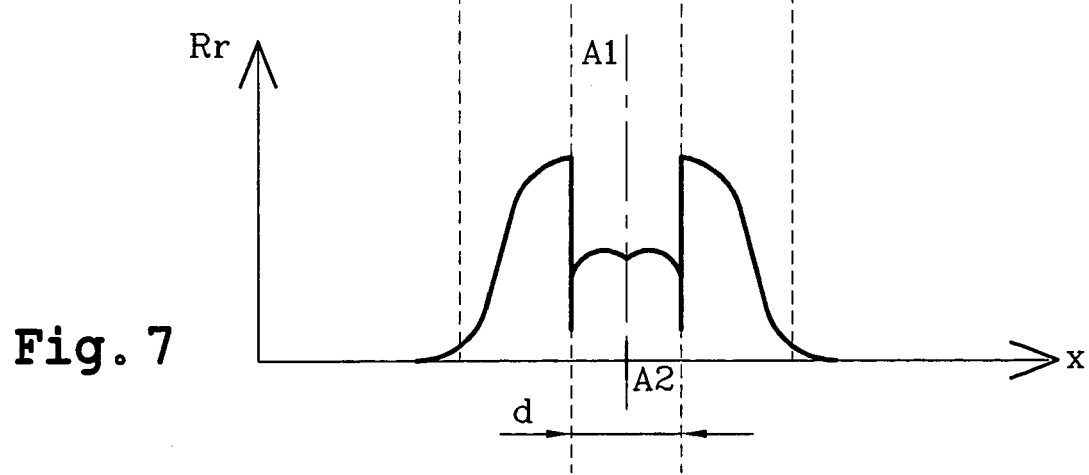
FIG. 7 shows the distribution of mechanical strength of a band of amorphous silicon according to the invention.

As shown in FIG. 7, the mechanical strength which unites the substrates 9 and 10 is low along the interfaces 22 and relatively high in the zones of widths 11 and 12 situated beyond the fusion band.

Cutting by cleavage along the interfaces is possible when the interfaces 22 define cleavage planes. When the interfaces 22 are not planes, for example when they define closed curves, cutting may be performed by KOH etching (KOH for potassium hydroxide). Advantageously, KOH etching for several minutes may be enough to dissolve an amorphous silicon band 30 µm wide over 500 µm depth such as a band according to the invention (by way of comparison, several hours are necessary for dissolving a thickness of untreated silicon of the same thickness).

The KOH etching can likewise by shortened by treating the substrate in the following manner: immersion in isopropanol, then in ethanol, then in deionized water, then finally in KOH. KOH etching may likewise be assisted by ultrasound.

What is claimed is:

1. Method of assembly of at least two silicon substrates, comprising:
    a step of placing in contact at least one substantially planar face of a first silicon substrate with a substantially planar face of a second silicon substrate so as to constitute an interface between the first and second substrates, the first and second substrates being substantially non-transparent for a wavelength $\lambda$ of laser radiation, and
    a step of illuminating the first silicon substrate with a laser beam of wavelength $\lambda$ to create a fusion path, along the laser beam axis, in the thickness of the first substrate and in all or part of the thickness of the second substrate,
wherein the creation of the fusion path is accompanied by a reduction of mechanical strength of the silicon at the interface between the fusion path and the remainder of the silicon substrate and, on either side of the fusion path, over a finite distance, a direct sealing of the interface between the two silicon substrates.

2. Method according to claim 1, wherein the laser beam of wavelength $\lambda$ is displaced over the surface of the first substrate so as to create successive fusion paths defining a plane.

3. Method according to claim 2, comprising a step of cutting by cleavage along at least one plane created by successive fusion paths.

4. Method according to claim 1, characterized in that the laser beam of wavelength $\lambda$ is displaced over the surface of the first substrate so as to create successive fusion paths defining a non-planar surface.

5. Method according to claim 4, comprising a step of cutting by KOH etching along at least one non-planar surface created by successive fusion paths.

6. Method according to claim 1, comprising a step of forming a vacuum between the two faces of the silicon substrates which constitute the interface.

7. Method according to claim 1, wherein the laser radiation is infrared radiation of wavelength $\lambda$ substantially equal to 1064 nm, of average power substantially equal to 12 W, and constituted by pulses of frequency substantially equal to 3 kHz.

* * * * *